Jan. 5, 1932. W. WILKIE 1,839,820
CAPSULE FILLING MACHINE
Filed April 25, 1927 5 Sheets-Sheet 1

Inventor
Warren Wilkie
By Whittemore Hulbert
Whittemore + Belknap
Attorneys

Jan. 5, 1932.  W. WILKIE  1,839,820
CAPSULE FILLING MACHINE
Filed April 25, 1927  5 Sheets-Sheet 2

Inventor
Warren Wilkie

Jan. 5, 1932.  W. WILKIE  1,839,820
CAPSULE FILLING MACHINE
Filed April 25, 1927   5 Sheets-Sheet 5

Inventor
Warren Wilkie

By Whittemore, Hulbert, Whittemore & Belknap
Attorneys

Patented Jan. 5, 1932

1,839,820

UNITED STATES PATENT OFFICE

WARREN WILKIE, OF DETROIT, MICHIGAN, ASSIGNOR TO PARKE, DAVIS & COMPANY, OF DETROIT, MICHIGAN, A CORPORATION OF MICHIGAN

CAPSULE FILLING MACHINE

Application filed April 25, 1927. Serial No. 186,482.

This invention relates to capsule filling machines and numbers among its objects to simplify, render more efficient and improve generally machines of this character.

Other objects of this invention are to provide a continuously operating machine which will automatically feed gelatine capsules and the like and arrange them in an upright position, cap upwards; separate or unjoin the cap and body and move the cap from its concentric relation with the body; forcibly fill the capsule with a predetermined quantity of material; rejoin the cap and body; and finally eject the filled capsule.

The invention contemplates the provision of simple but effective means for removing the cap, after its separation from the body, from its position above the open end of the body of the capsule whereupon material may be fed positively and by gravity to the capsule body.

Another feature of importance in the herein proposed construction consists in providing the outlet opening of the hopper or container for the material with a vertically adjustable wall which divides this outlet opening into two passages, in one of which a spiral or screw feeding element is arranged for forcibly feeding the material. By reason of this pair of passages any material fed by the screw, in excess of that required may escape under this adjustable plate and into the other passage. This affords a relief and prevents jamming or massing of the material. By making this plate adjustable it is possible to vary the size of the relief opening and thus control the freedom of flow of the material whereby the device may be regulated according to the degrees of density, stickiness or mobility of the material.

The various objects, advantages and novel details of construction of this invention will be made more apparent as this description proceeds, especially when considered in connection with the accompanying drawings wherein:

Referring now particularly to the drawings wherein like reference characters indicate like parts, it will be noted there is provided a base 10 upon which a hopper 11 is supported, this hopper being adapted to contain the capsules which are placed therein indiscriminately. The hopper 11 is provided with a paddle or stirrer 13 which causes the capsules to enter a tube 14 which extends downwardly therefrom and delivers the capsules to a capsule righting device which arranges the capsules cap end upwards.

Figures 2, 7:
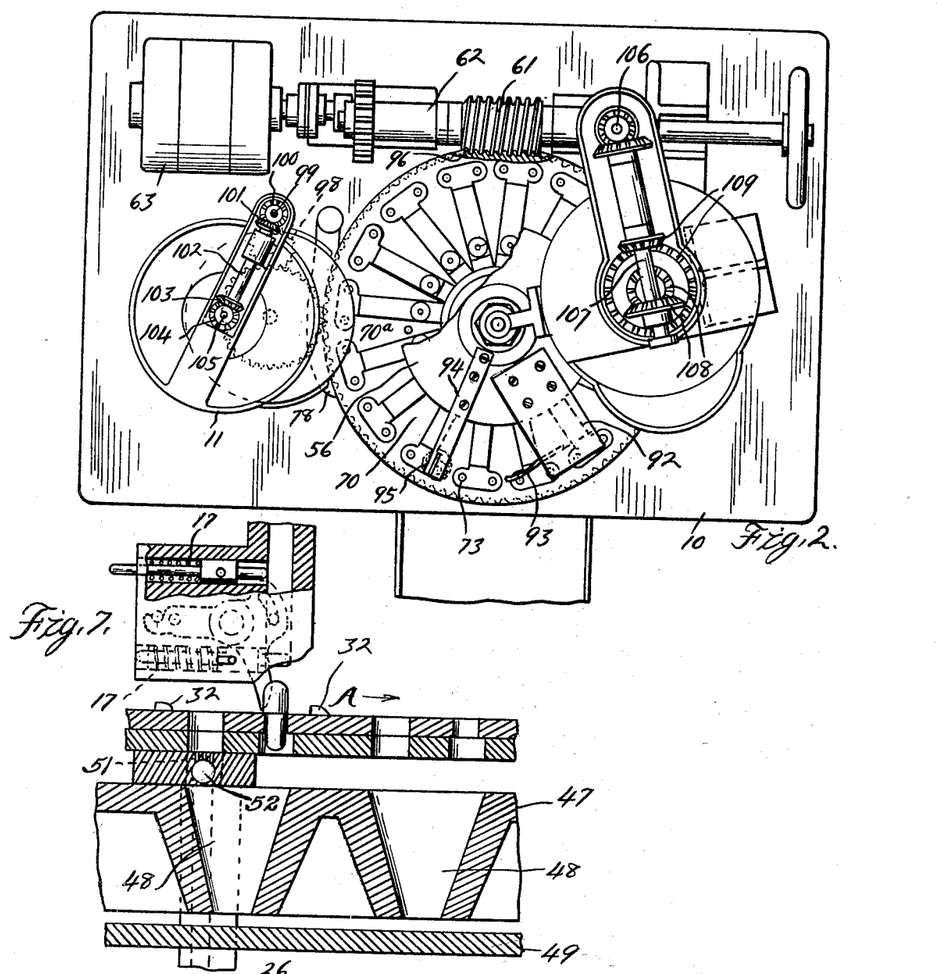
Figure 2 is a top plan view thereof, certain parts being broken away.
Figure 7 is a fragmentary detail sectional view taken substantially on the plane indicated by line 7—7 in Figure 1.
Figure 8:
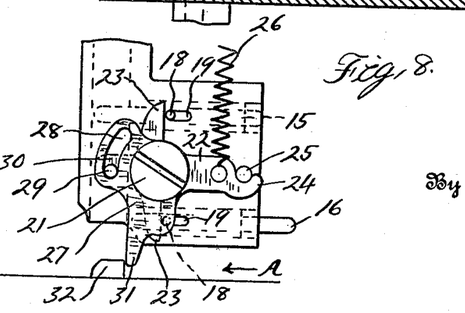
Figure 8 is a fragmentary elevational view of the capsule feed control mechanism.
Figure 9:
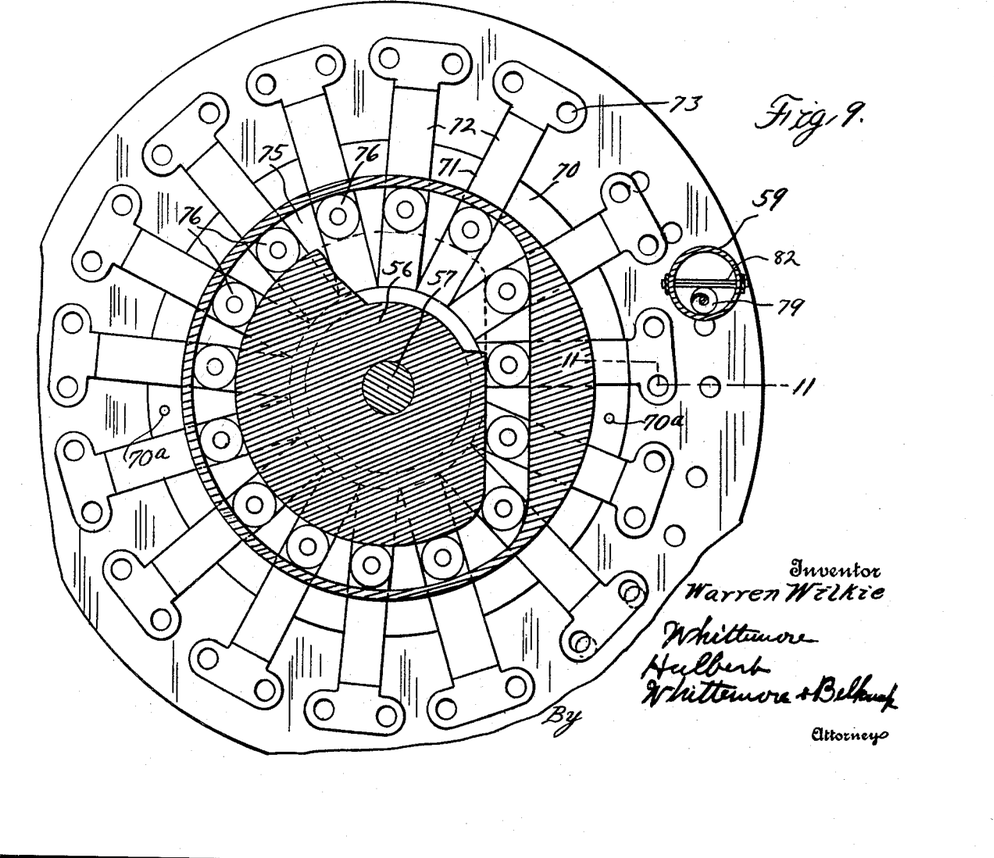
Figure 9 is a sectional view taken substantially on the plane indicated by line 9—9 in Figure 1.
Figure 10:
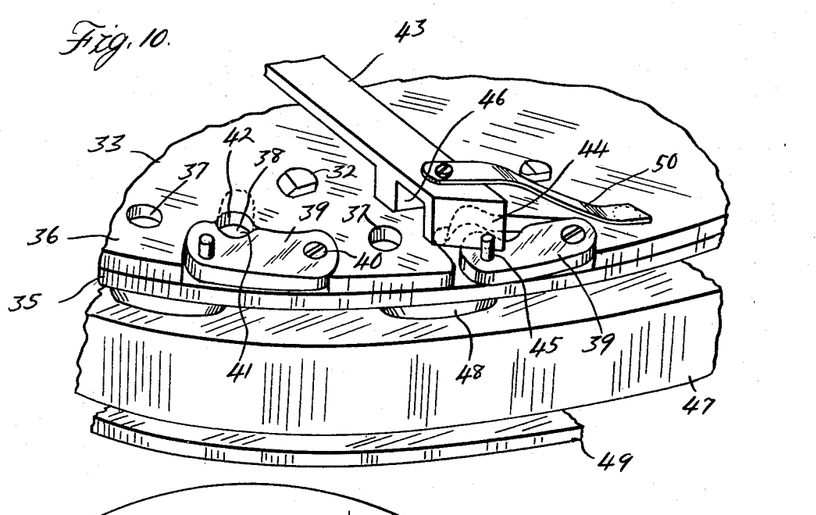
Figure 10 is a fragmentary perspective view of a portion of the capsule righting mechanism.
Figure 11:
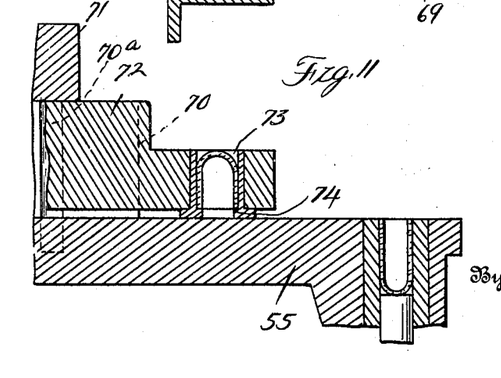
Figure 11 is a fragmentary sectional view taken substantially on the plane indicated by line 11—11 in Figure 9.
Figure 13:
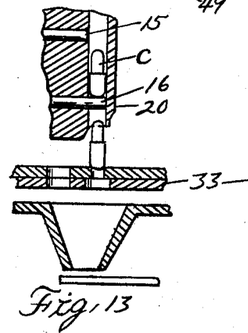
Figure 16:
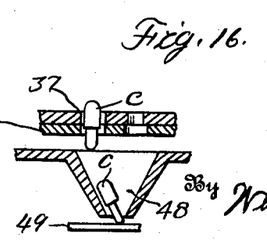

The exit of the capsules from the lower end of tube 14 is controlled by an intermittently operating mechanism which operates to permit one capsule at a time to be deposited upon the righting mechanism, yet to be referred to. This feed control mechanism comprises a pair of pins 15 and 16 which are normally urged by spring 17 in a direction in which their ends are projected into the path of travel of the capsules. Each of the pins 15 and 16 carries a laterally extending stud or projection 18 which projects through a slot 19 formed in the housing 20 in which the pins are reciprocably mounted. Pivoted upon a stud shaft 21 is an oscillatable rocker member 22 provided with a pair of diametrically extending arms 23 adapted to engage the projections 18. This rocker element 22 is provided with a hook shaped arm 24 which normally engages a pin 25 carried by the casing 20 under the influence of a spring 26. For rocking the element 22 there is provided a second element 27 also oscillatably mounted upon the stud shaft 21 provided with a slotted portion 28 which engages a pin 29 carried upon an arm 30 of the oscillatable element 22. A downwardly extending arm 31 of the element 27 is adapted to be engaged by projections 32 spaced circumferentially of the righting mechanism, yet to be referred to. The direction of movement of these abutments or projections 32 is in the direction of the arrow A in Figures 7 and 8 and upon engagement with the arm 31 an abutment 32 will rock the element 27 and by reason of the engagement of the pin 29 with the end of slot 28 will rock element 22 against the action of spring 26. Under such conditions the pin 15 will be withdrawn from the capsule passage by the action of the upwardly projecting arm 23 upon the laterally projecting pin 18. At the same time the corresponding downwardly extending arm 23 will be moved away from the laterally extending pin 18 of the lower pin 16 whereupon the spring 17 associated with the pin will project this pin across the capsule passage way as indicated in Figures 7 and 13. After the abutment 32 has passed the arm 31 sufficiently to clear the same the spring 26 will return the parts to the normal position illustrated in Figure 8, whereby the lower pin 16 has again been retracted and the upper pin 15 projected into the capsule passage. Thus single capsules are intermittently fed to the capsule righting mechanism. The lost motion connection between the element 22 and 27 provided by the slot and pin connection 28—29 prevents injury to the parts should the direction of movement of the righting mechanism and consequently of the abutments 32, be reversed. Under such conditions the abutments 32, see Figure 8, travelling in a direction opposite to that indicated by arrow A, will oscillate element 27 about stud 21 but no movement will be imparted to oscillatable element 22 because the pin 29 will pass idly through the slot 28.

The capsule righting mechanism consists of a circular table 33 rotatably mounted upon a shaft 34. The table is formed of two sections 35 and 36 formed with a plurality of pairs of apertures each consisting of a large aperture 37 and a smaller aperture 38. The large aperture 37 of each pair is of a size sufficient to permit the passage therethrough of the cap of the capsule. The other aperture 38 of each pair is so proportioned as to intercept the passage of the capsule therethrough by providing means which engages the cap of the capsule in the event the capsule was delivered thereto, cap upwards. This is accomplished by associating with each aperture 38 a latch member 39 pivoted as at 40 to the lower table section 35. This latch member is provided with a semi-circular recess 41 which cooperates with a semi-circular recess 42 formed in the table section 36 so as to form the upper portion of the aperture 38 of a dimension insufficient to permit the cap of the capsule to pass therethrough. The lower portion of the aperture 38 may be the same size as the aperture 37 or in other words sufficient to permit the passage therethrough of the capsule cap.

A fixed arm 43 carries on its outer end a cam surface 44 which is adapted to engage a pin or projection 45 carried on the free end of each of the latch members 39 so that as the table of the capsule righting mechanism rotates the latches 39 will be swung outwardly about their pivots 40 to thus release the capsule in the event one is carried in the smaller aperture 38. The arm 43 is also provided with a surface 46 which will engage the capsule to move the same laterally outwardly a short distance whereupon its disengagement with the semi-circular portion 42 is assured.

The capsule righting mechanism also includes a lower member 47 rigidly mounted on the shaft 34 in any desired manner and provided with a plurality of tapered or funnel shaped receivers 48 into which the capsule is deposited cap upwards. One of these funnel shaped receivers is arranged below each pair of apertures 37—38 and arranged below the receivers 48 is a platform 49, segmental in shape, which supports the capsule until that point in its path of travel when it is brought into registration with the de-capping mechanism, yet to be referred to.

Figures 3, 12, 14, 15:
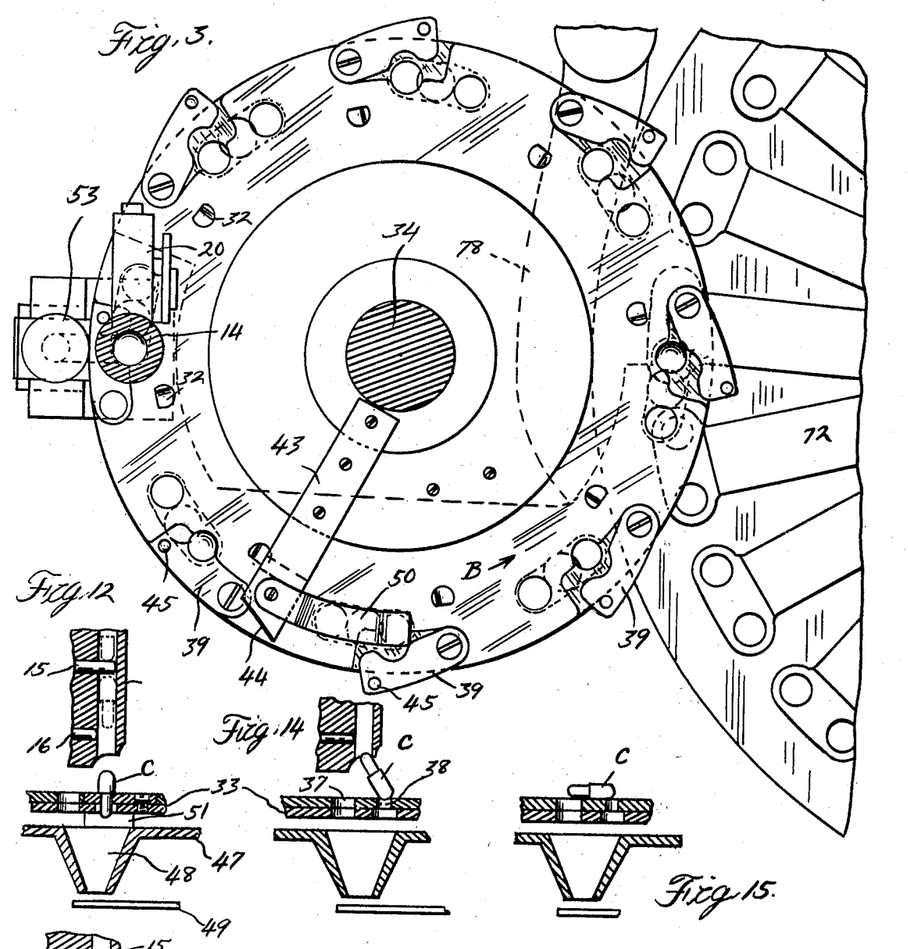
Figure 3 is an enlarged fragmentary sectional view taken substantially on the plane indicated by line 3—3 in Figure 1.
Figures 12 to 16 inclusive are diagrammatical sectional views showing the performance of the capsule in the righting mechanism.
Figure 4:
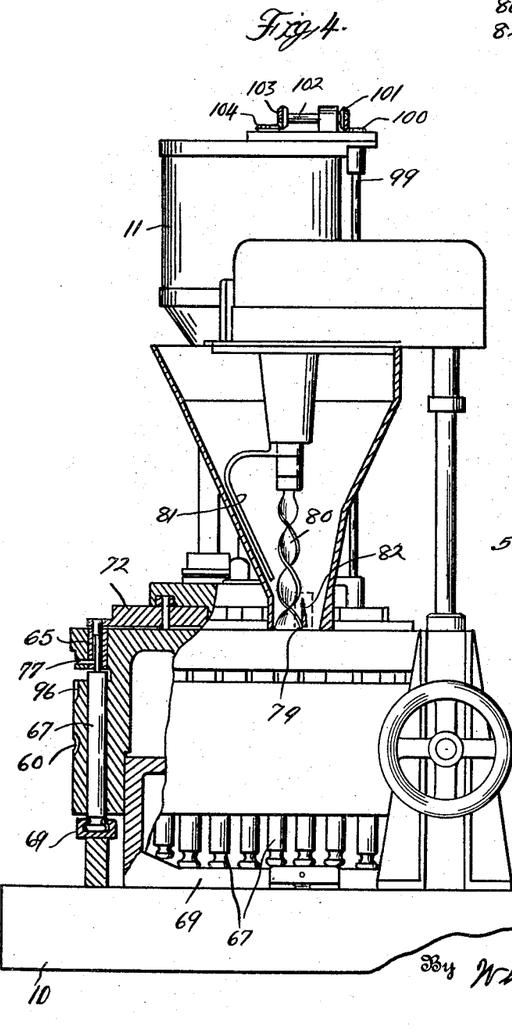
Figure 4 is an end elevational view partly in section.
Figure 5:
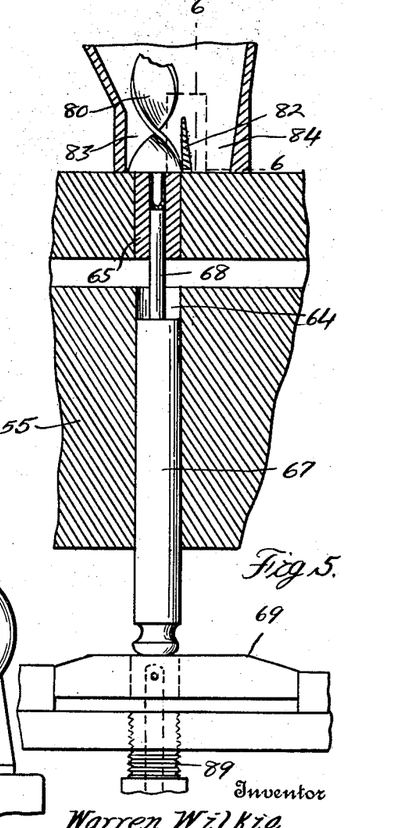
Figure 5 is an enlarged sectional view taken substantially on the plane indicated by line 5—5 in Figure 1.
Figure 6:
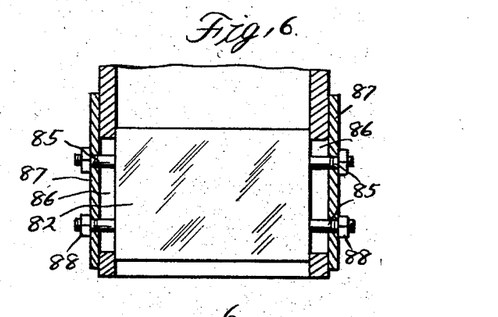
Figure 6 is an enlarged sectional view taken substantially on the plane indicated by line 6—6 in Figure 5.

By reference to Figures 12 to 16 inclusive the performance of the capsule in the righting mechanism will be made more apparent. In Figure 12 the capsule C has been deposited in aperture 38 cap upwards and as a consequence is held in this position because of the restricted upper portion of this aperture which is insufficient in diameter to permit the passage therethrough of the cap. After capsule C is deposited cap upwards it is carried by the table of the righting mechanism, which moves in the direction of arrow B, see Figure 3, until it comes adjacent arm 43 which as previously described carries cam 44 which upon engagement with pin 45 moves latch 39 upwardly so as to free the cap of the capsule. At the same time the capsule engages surface 46 which shoves the capsule off the recess portion 42 and during the continued rotation of the table the capsule is brought under spring member 50 which forcibly urges the capsule downwardly through the aperture into the funnel shaped receiver 48. While under ordinary circumstances the capsule would be deposited by gravity, nevertheless, the spring member 50 insures the deposit of the capsule into the receiver.

If, as suggested in Figure 13 the capsule C is deposited upon the table cap downwards then it is unable to pass through the aperture 38 because of the restricted upper portion thereof and as a consequence of the rotation of the table the cap is carried along by reason of its engagement with the apertures 38 and the capsule is laid upon the table as suggested in Figures 14 and 15 with the body end over the larger aperture 37. Communicating with the space between the table 33 and the member 47 is a suction or vacuum pipe 51 which is connected by means of a pipe or conduit 52 to a suction pump or the like (not shown). As a consequence of the suction or vacuum the capsule C is drawn from the position shown in Figure 15 to that shown in Figure 16 downwardly through apertures 37 where it is deposited into the funnel-shaped receiver 48 cap upwards. It should be understood that the vacuum or suction assists also in speeding up the action of the capsule whether it is drawn downwardly through the larger aperture 37 or deposited into the smaller aperture 38.

The latch members 39 remain in the released position during the remainder of the travel of the table and are again moved back to operative position just prior to the time the pair of apertures come under capsule delivery tube 14, by means of a roller 53.

Projecting upwardly from the base 10 of the machine is a cylindrical member 54 upon which a member or body 55 is mounted for rotation. Vertical displacement of the rotatable body 55 is prevented by means of a cap plate 56 which may be conveniently held in place by a cap screw bolt 57 which likewise for convenience may be extended upwardly to provide a support 58 for a material hopper or container 59, yet to be referred to in detail. The body 55 is provided with a worm gear 60 which meshes with a worm 61 on a shaft 62 driven, in the embodiment herein illustrated, by means of a motor 63.

The body 55 is provided with a plurality of circumferentially arranged vertically extending apertures 64 which may be reduced in diameter at their upper ends, as for instance, by the insertion of sleeves 65 to form a bore or opening 66 just the proper size to receive the body of the capsule but of insufficient diameter to permit the cap of the capsule to enter therein. Slidably mounted in each opening 64 is a plunger 67, the upper reduced end 68 of which is adapted to enter and reciprocate in the reduced bore 66 while the lower end of the plunger extends below the lower end of aperture 64 and engages a ring cam 69 fastened to the base 10 of the machine.

Mounted upon the upper face of body 55 as by studs 70$^a$ is a disc-like body 70 formed with a plurality of radially extending slots 71 in each of which an arm 72 is slidably mounted. The outer end of each arm 72 is provided with an aperture 73 which when the arm is in its outer-most position is concentric with the bore 66 of the main body. Each aperture 73 is of two diameters, the lower end of each aperture being restricted to form a shoulder 74 whereupon the cap of the capsule may be received in the upper larger portion of each aperture but is unable to pass the shoulder 74. However, the diameter of the restricted portion of this aperture is sufficient to permit the passage therethrough of the body of the capsule.

The under face of cap plate 56 is provided with a cam groove 75 in which stud rollers 76 carried by the inner ends of arms 72 are adapted to engage. As a consequence of this, a rotation of the main body 55 and the disc-like body 70 will cause a like movement to be imparted to the arms 72 and inasmuch as the cap plate 56 is held stationary the stud rollers 76 will travel around the cam groove 75 thus imparting a radial sliding movement to the arms. As a consequence of this the arms will be moved from their outer-most position where the apertures 73 are in alignment with the bore 66 to a radially inward position where the outer ends of the arms 72 are out of alignment with the bore 66.

Figure 1:
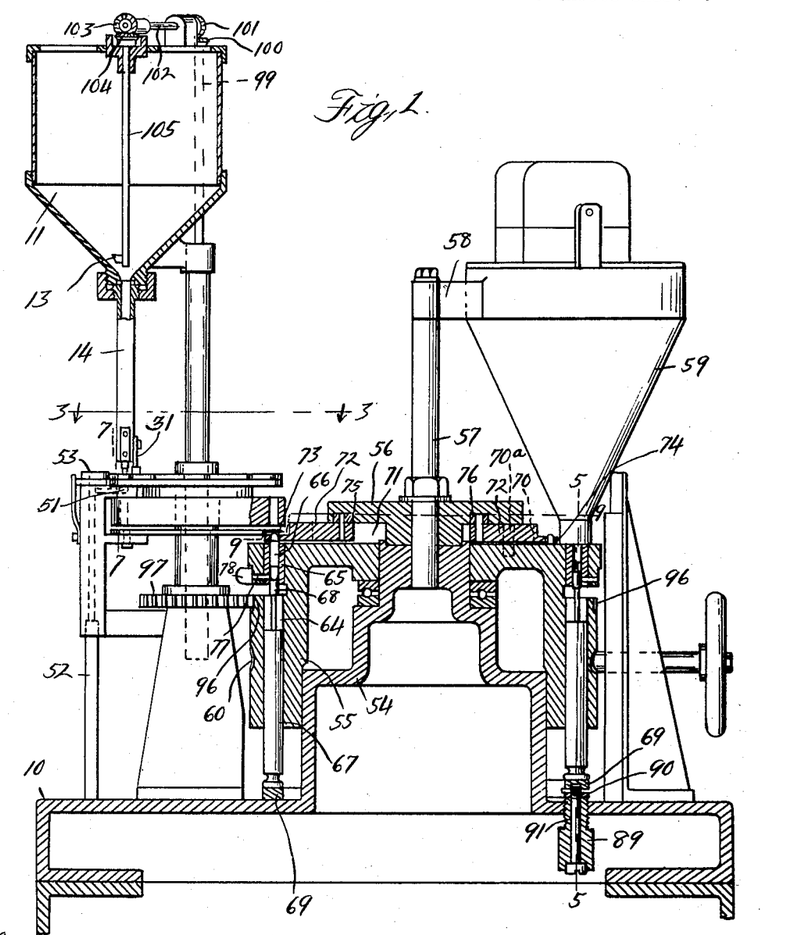
Figure 1 is a side elevation, partly in vertical section, of a machine constructed in accordance with my invention.

The body 55 is provided with a plurality of apertures 77 which extend horizontally inwardly from the outer cylindrical surface thereof and communicate with the bore 66 at a point just above the upper end of the reduced end 68 of the plunger, when these plungers are in the position illustrated at the left hand side of Figure 1. Arranged at the side of the body and bearing thereagainst is the end of a suction pipe 78 which is connected to a vacuum pump (not shown). During rotation of the body 55 the apertures 77 are brought into communication with the end 78 of the suction pipe and a suction or vacuum is created in the bore 66 for a purpose to appear more fully hereinafter.

During that movement in the cycle of operations, in which a suction is created in bore 66 the table 33 of the righting device has moved so as to bring a receiver 48 thereof in registration with the aligned aperture 73 and bore 66. This position of the parts is illustrated more clearly in Figure 1. The suction in the bore 66 acts to quickly draw the capsule from the receiver 48 into the aperture 73 whereupon it is arrested by the engagement of the cap thereof with the restricted portion or shoulder 74 of the aperture. The suction then acts to draw the body of the capsule downwardly into the bore where it rests upon the upper end of the plunger which is positioned just below the vacuum aperture 77. Thus the unjoining of the capsules is effected and as the table rotates to move the bore away from the suction pipe 78 the body of the capsule reposes in the lower end of bore 66 in contact with the upper end of the plunger while the cap of the capsule rests within the aperture 73 of the corresponding arm 72.

As previously mentioned the continued rotation of the bodies 55 and 70 causes a radially inward movement of the arms 72 so that when a rotation of substantially 180 degrees has taken place the arms 72 have moved radially inwardly to move the cap of the capsule from its concentric position with reference to the body thereof. This brings the body of the capsule under the material hopper 59 whereupon material is introduced therein in a manner now to be more fully described.

The material hopper will preferably, although not necessarily, be in the form of a cone shaped funnel wherein the medicament or other material may be introduced into the upper end thereof and discharged through an opening 79 located in the bottom thereof. The lower discharge opening of the hopper 59 is positioned close to the upper surface of body 55 so that the escape of material is either prevented or reduced to a minimum. Arranged within the hopper is a rotatable spiral or screw 80 for positively feeding the material and a scraper or agitator 81 may also be provided and rotated therewith. Arranged within the outlet opening 79 of the hopper is a plate or wall member 82 which divides the outlet opening into two passages 83 and 84 and is preferably vertically adjustable. While any means for adjusting plate 82 may be provided, I have shown this plate as being provided with oppositely extending studs or projections 85 which extends through slots 86 in the hopper wall, clamping plates 87 being provided which cover the slots 86. By means of nuts 88 threaded on to the ends of studs 85 the plate member may be secured in its adjusted position.

The screw feed 80 extends down within the passage 83 to a point substantially coincident with the lower edge of the opening 79 so as to positively feed the material of the hopper into the bore 66 arranged thereunder and consequently into the body of the capsule. By arranging the plate 82 in the manner just described relief is provided to prevent jamming or massing of the material. By adjusting the plate 82 the size of the opening provided between the lower edge of the plate and the upper face of the body member 55 may be regulated to thus make the escape of the material from passage 83 to passage 84 easier or more difficult as the circumstances require. This has the advantage that the feeding mechanism may be adjusted to compensate for varying degrees of mobility, stickiness or density of the material being fed so that doses of accurate amounts may be fed to the individual capsules.

From an examination of Figure 1 in particular, it will be noted that the ring cam 69 at that point in its path which is arranged under the hopper 59 is elevated with reference for instance to a diametrically opposite point so that the plungers 67 force the capsule bodies upwardly within the bore 66 so that the capacity of the space between the bottom of the capsule and the upper end of the bore 66 is sufficient only to receive the proper amount of material. In order that the position of the capsule body within the bore 66, and as a consequence, the capacity of the bore may be regulated, the cam ring 69 is made adjustable at this point in its length. This may be conveniently accomplished by providing set screws 89 threaded upwardly through the base 10 to engage the lower surface of the cam ring 69, the cam ring being secured for instance by means of a pin 90 to the upper end of an anchor screw 91 extending through the set screw 89.

After the capsules pass from beneath the hopper 59 the cam ring 69 starts to move the plungers 67 upwardly so as to raise the body of the capsule. At the same time the cam groove 75 moves the arms 72 radially outwardly until the cap again reaches a position concentric with the body. At this moment the arm carrying the cap passes under an abutment or cap plate 92 secured to cap plate 56. This prevents any vertical movement of the cap of the capsule and as the cam ring 69 continues to force the plunger 67 upwardly the body of the capsule is forced into the cap and the capsule rejoined. Immediately after this rejoining the arm 72 is carried past the abutment plate 92 and the continued movement upwardly of the plunger ejects the filled capsule. A preferably resilient arm 93 is provided which engages the capsule to force the same laterally off the table 55. This occurs at that point in the rotation of the body 55 when an arm 72 passes beyond the left hand end of the abutment plate 92 illustrated in Figure 2. An arm 94 carrying a brush 95 may be provided to clean the apertures of loose powder, capsule parts, etc. The cam ring thereafter permits the plunger 67 to assume the position illustrated at the left of the body 55 in Figure 1 and the cam groove 75 maintains the arms 72 in the position also illustrated at the said portion of Figure 1 whereupon the aligned apertures 73 and bore 68 are again brought under the receivers 48 of the table of the righting device and the cycle of operations just described are repeated.

As was previously mentioned the main body 55 is rotated by worm 61 meshing with worm gear 60. The body 55 is provided with a peripheral gear 96 which drives the table of the righting mechanism through the gear 97. Gear 97 meshes with pinion 98 which in turn meshes with a pinion on the lower end of shaft 99. Bevel gears 100 and 101, shaft 102 and bevel gears 103 and 104 provide means for driving shaft 105 which carries the stirrer or paddle 13 at its lower end. The feed screw 80 and agitator 81 are operated by a chain of gears including a shaft 106 driven by power shaft 62, bevelled gear shaft 107 and pairs of bevelled gears 108 and 109 respectively. Thus it will be seen that the several working parts of the device are driven from a single power source so that the several operations performed by the machine may be properly co-related and synchronized and thus provide a machine of continuous automatic operation without requiring the presence of an attendant.

While from the foregoing the operation of the machine will be obvious, it may be noted briefly that first the capsules are introduced indiscriminately in the capsule container 11 from which they pass downwardly through tube 14 and are deposited in the righting mechanism. Here the capsules are arranged in an upright position with the caps upward and are delivered to the receivers of the table 33. The rotation of this table brings the capsules to the main body 55 of the machine where they drop by gravity, assisted by suction, into the opening formed by the alignment of aperture 73 with bore 66. The suction which is applied, draws the body of the capsule downwardly in the bore 66, while the cap remains in the aperture 73 by reason of its inability to pass the shoulder 74. The rotation of the main body 55 and of the disc-like body 70 causes a movement of the arms 72 carrying the caps radially inwardly whereby the caps are moved from over or out of concentric relation with the bodies of the capsules. At this point in the cycle of operations the bodies of the capsules are passed under the material feeding hopper whereupon material is forcibly fed into the bore containing the capsule. By reason of the fact that the caps have previously been removed laterally with reference to the open upper end of the body the feeding of the material is facilitated because the efforts of gravity may be utilized in addition to the positive feeding mechanism. Furthermore means is provided for preventing the escape of any of the material and relief means is provided to permit the escape of that material fed, which is in excess of the amount required. Furthermore this escape or relief opening is made adjustable so as to adjust the feeding mechanism according to the density, stickiness or mobility of the material. As the body passes from under the hopper the plungers 67 move the capsule body upwardly within the bore 66 and at the same time the arms 72 bring the caps back into a position concentric with the bodies. At this moment the arms carrying the caps pass under the abutment plate 92 and the continued upward movement of the plungers force the body of the capsule into the cap to effect the rejoining of the capsules. After the rejoining operation is completed the main body passes from under the abutment plate and the continued upward movement of the plungers eject the filled recapped capsules.

One of the important features of the herein described construction consists in the mechanism where the cap of the capsule is moved from its concentric position with reference to the body during that period of the cycle of operations at which the filling of the capsule is accomplished. While radially movable arms have been shown for carrying out this step of the operations it will be immediately apparent to those skilled in this art that numerous other types of mechanism may be provided for accomplishing the same purpose. For instance, the arms carrying the caps may be hinged and provided with mechanism for moving the same upwardly and out of the way; or the arms may be mounted so as to be slidable on an oblique or inclined track; or the arms may move radially outwardly instead of inwardly; or curved arms may be provided which would revolve to move the cap out of its concentric relation with reference to the body. Another feature of importance is the adjustable plate 82 which divides the outlet opening of the hopper into filling and relief passages with the advantages as pointed out at some length hereinbefore.

While for the purposes of illustration one mechanical embodiment of the invention has been described and illustrated herein somewhat in detail, it will be apparent to those skilled in this art that various changes may be made in many of the essential and all of the non-essential details of the construction without departing from the spirit and scope of this invention and to this end reservation is made to make such changes as may come within the purview of the accompanying claims.

What I claim as my invention is:

1. In a capsule filling machine, the combination with capsule feeding and unjoining mechanism, of mechanism for feeding material to said capsule including a material feed ing element and relief means for material in excess of the amount required.

2. In a capsule filling machine, the combination with capsule feeding and unjoining means, of means for filling the capsule with material including a material feeding screw and means for controlling the escape of excess material.

3. In a capsule filling machine, the combination with capsule feeding and unjoining means, of means for filling the capsule with material including a material feeding element and an adjustable member for controlling the escape of excess material.

4. In a capsule filling machine, the combination with capsule feeding and unjoining means, of capsule filling means including a hopper for the material, a feeding screw and an adjustable element for controlling the escape of material fed by said screw in excess of that required by the capsule.

5. In a capsule filling machine, the combination with capsule feeding and unjoining means, of capsule filling means including a hopper for the material provided with a discharge opening, means for presenting the body of the capsule beneath the discharge opening of the hopper, means for forcibly feeding the material into said capsule body and adjustable means for controlling the escape of material in excess of that required to fill the capsule.

6. In a capsule filling machine, the combination with capsule feeding and unjoining means, of capsule filling means including a hopper for the material provided with a discharge opening, means for presenting the body of the capsule beneath the discharge opening of the hopper, a screw for forcibly ejecting material through said discharge opening and a plate in said discharge opening dividing the same into a material exit and a relief passage for the escape of excess material.

7. In a capsule filling machine, the combination with capsule feeding and unjoining means, of capsule filling means including a container for the material provided with an opening at the bottom thereof, means for presenting the body of the capsule under said opening, a plate arranged adjacent said opening dividing the same into two passages and a material feeding screw in one of said passages for feeding the material to the capsule body, any excess material passing up said other passage.

8. In a capsule filling machine, the combination with capsule feeding and unjoining means, of capsule filling means including a container for the material provided with an opening at the bottom thereof, means for presenting the body of the capsule under said opening, a plate arranged adjacent said opening dividing the same into two passages, means for adjusting said plate, and a material feeding screw in one of said passages for feeding the material to the capsule body, any excess material passing up said other passage.

9. In a capsule filling machine, the combination with capsule feeding and unjoining means, of capsule filling means including a container for the material provided with an opening at the bottom thereof, means for presenting the body of the capsule under said opening, a plate arranged adjacent said opening dividing the same into two passages, means for vertically adjusting said plate with respect to the edge of said opening and a material feeding screw in one of said passages for feeding the material to the capsule body, any excess material passing up said other passage.

10. In a capsule filling machine, the combination with capsule feeding and unjoining means, of a hopper for the material having an outlet opening at the bottom thereof, means for presenting the body of the capsule under said opening, a plate dividing said opening into two passages, a screw within said hopper and extending within one of said passages to a point adjacent the outlet end thereof for forcibly feeding the material to said capsule body and means for vertically adjusting said plate for varying the freedom of escape of the excess material into said other passage.

11. In a capsule filling machine, capsule unjoining mechanism including an arm, a member, said arm and member being provided with aligned apertures for receiving the capsule, cap engaging means associated with said arm and means for longitudinally sliding said arm relative to said member to longitudinally disalign said cap with respect to the body of the capsule.

12. In a capsule filling machine, capsule unjoining mechanism including two members provided with normally aligned apertures, cap engaging means in one of said apertures and means for longitudinally moving one of said members to disalign the cap with respect to the body of the capsule.

13. In a capsule filling machine, capsule unjoining mechanism including two members provided with normally aligned apertures, one of said apertures having two diameters and means for radially moving one of said members to disalign the aperture therein with respect to said other aperture.

14. In a capsule filling machine, capsule unjoining mechanism including a member formed with a bore and a second member formed with a shouldered aperture normally aligned with said bore, means for positioning a capsule in proximity to the recess formed by said aligned bore and aperture, means for drawing the capsule into said recess and the body of the capsule into said bore and means for moving the other member to position the cap non-concentric with relation to the body.

15. In a capsule filling machine, capsule unjoining mechanism including a member formed with a bore and a second member formed with a shouldered aperture normally aligned with said bore, means for moving a capsule in proximity to the recess formed by said aligned bore and aperture, means for drawing the capsule into said recess and the body of the capsule into said bore while the cap is held by the shoulder of said aperture and means for moving the cap from its concentric position with relation to the body.

16. In a capsule filling machine, the combination with means for delivering capsules in an upright position cap upwards, of capsule unjoining mechanism including, a pair of members formed with normally aligned apertures adapted to receive the capsule from said delivery means, means in the uppermost aperture for arresting the cap, suction means for drawing the body of the capsule out of the cap, and means for moving the cap laterally with refeernce to the body to expose the upper open end of the body.

17. In a capsule filling machine, the combination with means for delivering capsules in an upright position cap upwards, of capsule unjoining mechanism including, a pair of members formed with normally aligned apertures adapted to receive the capsule from said delivery means, means in the uppermost aperture for arresting the cap, suction means for drawing the body of the capsule into the other aperture and means for moving the cap laterally with reference to the body to expose the upper open end of the body.

18. In a capsule filling machine, the combination with means for delivering capsules in an upright position cap upwards, of capsule unjoining mechanism including, a pair of members formed with normally aligned apertures adapted to receive the capsule from said delivery means, means in the uppermost aperture for arresting the cap, means for rotating said members and means actuated by said rotation for rectilinearly moving the member carrying said cap to laterally displace the cap with reference to the body.

19. In a capsule filling machine, the combination with means for delivering capsules in an upright position cap upwards, of capsule unjoining mechanism including, a pair of members formed with normally aligned apertures adapted to receive the capsule from said delivery means, means in the uppermost aperture for arresting the cap, means for drawing the body of the capsule into the other aperture, means for rotating said members and means actuated by said rotation for longitudinally moving the member carrying the cap to a position where the cap is vertically disaligned with respect to said body.

20. In a capsule filling machine, the combination with a material hopper having a discharge opening, of a pair of members adapted for rotation under said discharge opening, said members being provided with normally aligned apertures adapted to receive a capsule, means for unjoining said capsule and means for moving the cap from its concentric position with the body during the time said members pass under said discharge opening.

21. In a capsule filling machine, a material hopper provided with a discharge opening in its lower end, a pair of members rotatable in a horizontal plane from a position spaced from to a position immediately under said discharge opening, said members being provided with means for receiving a capsule and unjoining the same and means operable during rotation of said members for moving the cap from above the body while said body passes under said discharge opening.

22. In a capsule filling machine, capsule unjoining means including a pair of members, one of said members being formed with a bore to receive the capsule body, a plunger reciprocable in said bore and means for adjusting said plunger to control the position of the capsule body within the bore and to regulate the capacity of the bore.

23. In a capsule filling machine, capsule unjoining means including a pair of members, one of said members being formed with a bore to receive the capsule body, a plunger reciprocable in said bore and a cam for operating said plunger to control the position of the capsule body within the bore and for ejecting the filled capsule.

24. In a capsule filling machine, capsule unjoining means including a pair of members, one of said members being formed with a bore to receive the capsule body, means for feeding material to said capsule to fill the same, a plunger reciprocable in said bore and adjustable cam means for operating said plunger to control the position of the capsule body within the bore and to thus regulate the amount of material which may be fed to said capsule.

25. In a capsule filling machine, a material hopper having a discharge opening, and means forming a by-pass to return excess material discharged through said opening to said hopper.

26. In a capsule filling machine, capsule unjoining mechanism including a member provided with a plurality of slots, members slidably mounted in said slots, the said last mentioned members being provided with apertures for supporting the caps of capsules, and means for moving the said last mentioned members in their slots.

27. In a capsule filling machine, capsule unjoining mechanism including a rotatable member, arms mounted radially of said member, the said arms being provided with apertures for supporting the caps of capsules, and means for moving said arms radially of said member.

28. In a capsule filling machine, capsule righting mechanism including a table, a tube for depositing a capsule on said table, a receiver, and means for drawing the capsule from said table into said receiver.

29. In a capsule filling machine, capsule righting mechanism including a table provided with a plurality of apertures to permit the passage therethrough of a capsule, and a latch carried by said table for temporarily preventing the passage of the capsule through said table.

30. In a capsule filling machine, a capsule righting mechanism including a table provided with a plurality of apertures for permitting the passage therethrough of a capsule, means for temporarily preventing the passage of capsules through said table and means for releasing said restraining means upon a predetermined movement of the said table.

31. In a capsule filling machine, capsule righting mechanism including a table having an aperture, means for depositing a capsule in the aperture in said table, a latch for preventing the passage of the capsule through said aperture, and means for releasing said latch and for moving said capsule to cause the same to pass through said aperture.

In testimony whereof I affix my signature.

WARREN WILKIE.